United States Patent [19]

Hauris

[11] Patent Number: 4,821,183
[45] Date of Patent: Apr. 11, 1989

[54] A MICROSEQUENCER CIRCUIT WITH PLURAL MICROPROGROM INSTRUCTION COUNTERS

[75] Inventor: Jon F. Hauris, Manassas, Va.

[73] Assignee: International Business Machines Corporation, Armonk, N.Y.

[21] Appl. No.: 937,772

[22] Filed: Dec. 4, 1986

[51] Int. Cl.$^4$ .............................................. G06F 9/30
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,585,605 | 6/1971 | Gardner et al. | 364/200 |
| 3,593,313 | 7/1971 | Tomaszewski et al. | 364/200 |
| 3,967,104 | 6/1976 | Brantingham et al. | 364/900 |
| 3,978,454 | 8/1976 | Willard | 364/900 |
| 3,991,404 | 11/1976 | Brioschi et al. | 364/200 |
| 4,003,033 | 1/1977 | O'Keefe | 364/200 |
| 4,038,643 | 7/1977 | Kim | 364/200 |
| 4,099,229 | 7/1978 | Kancler | 364/200 |
| 4,159,520 | 6/1979 | Prioste | 364/200 |
| 4,160,289 | 7/1979 | Bambara et al. | 364/200 |
| 4,179,737 | 12/1979 | Kim | 364/200 |
| 4,323,963 | 4/1982 | Wu | 364/200 |
| 4,370,729 | 1/1983 | Bosch | 364/200 |
| 4,429,361 | 1/1984 | Maccianti et al. | 364/200 |
| 4,438,492 | 3/1984 | Harmon, Jr. et al. | 364/200 |
| 4,439,827 | 3/1984 | Wilkes | 364/200 |
| 4,446,518 | 5/1984 | Casamatta | 364/200 |
| 4,551,798 | 11/1985 | Horvath | 364/200 |

FOREIGN PATENT DOCUMENTS 8401843  8/1982  PCT Int'l Appl. .
2073923  4/1980  United Kingdom .

Primary Examiner—David Y. Eng
Attorney, Agent, or Firm—H. St. Julian; John E. Hoel

[57] ABSTRACT

A microsequencer includes at least two program counters which access microinstructions stored in a memory system. A first program counter is cyclicly incremented to sequentially access microinstructions of a principal microprogram. When a particular microinstruction is accessed which indicates that a subroutine will be the next program to be executed, a branched-from address, representing the microinstruction calling the subroutine, is retained in the first program counter. An address representing the first instruction of the subroutine is loaded into a second program counter. The second program counter is then cyclicly incremented to sequentially access microinstructions associated with the subroutine. After the subroutine has been executed, the first program counter is re-enabled and cyclicly incremented so that the execution of the principal program is resumed in an orderly manner.

3 Claims, 3 Drawing Sheets

A MICROSEQUENCER CIRCUIT WITH PLURAL MICROPROGROM INSTRUCTION COUNTERS

BACKGROUND OF THE INVENTION

1. Field of the Invention

This invention relates to a data processing system and more particularly to a microsequencer circuit used in a sequential type microprocessor for increasing the speed of microcode/control word access and generation.

2. Background Information

It is known that data processing systems generally comprise a central unit, a main memory and plurality of peripheral units connected to the central unit by means of a plurality of input/output channels for the exchange of information. The data processing system functions by processing data according to well defined program instructions. From a logical point of view, the central unit comprises a control unit and an operative unit. The program instructions are interpreted and executed by means of microprograms which are microinstruction sequences read from a control memory by the control unit, one microinstruction at a time. Through suitable decoding the microinstructions generate a set of elementary commands, or microcommands, which cause the operation of several logic networks of the central unit in the manner required by the several program instructions.

Generally, the control unit includes a program counter which enables the control unit to sequentially execute the program instructions. However, the execution of a program instruction may cause an interruption in the sequential execution thereof in order to execute a subroutine. All of the information regarding the status of the interrupted process must be saved in order to resume such process once the subroutine has been executed. One known technique for solving this problem includes a register file or RAM partition dedicated to a push-down stack function where each consecutive branched-from address is stored in a last in/first out order. This technique requires the skipping of machine cycles in order to access the register file or RAM partition.

Another known technique includes the use of a plurality of control store memories. A first control store memory contains the primary microinstruction group, a second control store memory contains a branched-to subroutine microinstruction group and possibly a third control store memory contains tertiary branched-to subroutine microinstruction groups. In such a configuration, a branched-from address must be stored prior to accessing the secondary or tertiary control store memories. Moreover, after the subroutine has been executed, machine cycles must be skipped in order to access the branched-from address in order to resume the execution of the primary microinstruction group.

Consequently, there is a need for a microsequencer which overcomes the necessity for skipping machine cycles in order to access the branched-from address.

OBJECTS OF THE INVENTION

Therefore it is an object of the invention to provide an improved microsequencer for a data processing system.

It is another object of the invention to provide an improved microsequencer which avoids the skipping of machine cycles in a sequential microcoded microprocessor in accessing a branched-from address.

SUMMARY OF THE INVENTION

These objects, features and advantages of the invention are accomplished by an improved microsequencer disclosed herein. The microsequencer circuit includes a memory means for storing a plurality of instructions therein and a first means for sequentially addressing the instructions. A second means, responsive to a subroutine being addressed by the first addressing means, sequentially addresses instructions associated with the addressed subroutine. A branched-from address is stored in the first addressing means and a first address of the subroutine is loaded in the second addressing means. An enabling means facilitates the sequential accessing of the instructions of the subroutine until the execution thereof is completed. Thereafter, the enabling means disables the second addressing means and then re-enables the first addressing means to continue to sequentially address instructions stored in the memory means.

Alternately, the microsequencer includes a first programmed logic means for generating a first address associated with an instruction. A first counter which receives an input from the first programmed logic means, combines with the first logic means to sequentially address microcode stored in a second programmed logic means. Microcode stored in the second logic means is then sequentially addressed until a subroutine call is encountered. Thereafter, the first counter is disabled and a second counter is enabled in combination with the first programmed logic means and the first counter to sequentially access microcode associated with the called subroutine. After the subroutine has been executed, the second counter is disabled and the first counter re-enabled so that the first programmed logic means and the first counter continued to sequentially address tthe microcode associated with the instruction.

BRIEF DESCRIPTION OF THE DRAWINGS

This invention will be described in greater detail by referring to the accompanying drawings and the description of the best mode that follows.

DESCRIPTION OF THE BEST MODE FOR CARRYING OUT THE INVENTION

Figure 1:
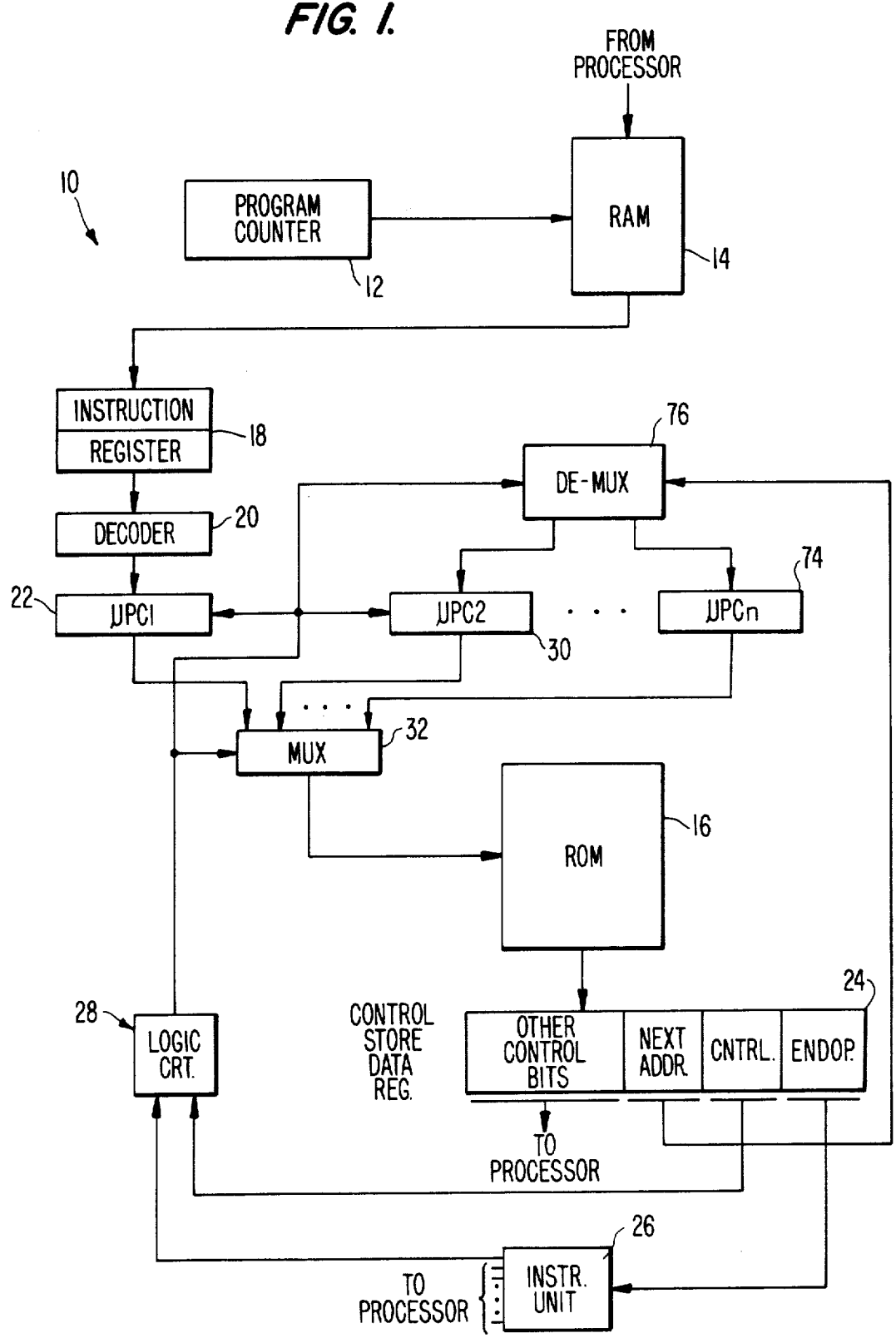
FIG. 1 is a block diagram implementation of a microsequencer circuit in accordance with the principles of the invention.

Referring to FIG. 1, there is shown a block diagram implementation of a microsequencer circuit 10 in accordance with the principles of the invention. A program counter 12 facilitates the sequential execution of a plurality of program instructions stored in a random access memory (RAM) 14. A primary microinstruction group, which includes a plurality of microinstructions, is stored in a control store memory such as a read only memory (ROM) or a programmed logic array (PLA) 16. Additionally, a micro subroutine group, which includes a plurality of subroutines each containing a plurality of microinstructions associated with the respective subroutine, is stored in ROM 16. Each of the stored microinstructions includes a field of control bits which may be fully encoded, partially encoded or unencoded. In addition, each microinstruction includes a sequence field which specifies whether a selected microinstruction is to be succeeded by the next microinstruction in sequence or is either a conditional branch instruction, jump to subroutine instruction or return from subroutine instruction.

A selected program instruction is fed to an instruction register (IR) 18. An op code associated with the selected program instruction is then decoded by a decoder circuit 20 in order to generate a microaddress which is associated with the op code. The microaddress is then loaded into a first microprogram counter 22 which facilitates the sequential accessing of microinstructions stored in the ROM 16. Thereafter, the microaddress contained in the first microprogram counter 22 is fed to an address register (not shown) associated with the ROM 16. When the ROM 16 is addressed by the current address in the address register, a corresponding microinstruction is read out in parallel and loaded into a control store data register (CSDR) 24. As noted above, each of the microinstructions stored in the ROM 16 includes a plurality of fields. These fields are used to activate or enable a digital device to be controlled such as the instruction register 18, an instruction unit 26 and logic circuit 28. The first microprogram counter 22 is then incremented to address the next sequentially stored microinstruction.

Alternately, when a particular microinstruction is accessed and indicates that a subroutine will be the next program to be executed, the CSDR 24 facilitates the disabling of the first microprogram counter 22, the enabling of the second microprogram counter 30 and a switching of the multiplexer 32 to the second microprogram counter. The microprogram counter 22 retains the last microaddress stored therein as a branched-from address. The branched-from address is associated with the microinstruction which called the subroutine. The instruction unit 26 facilitates the loading of an address associated with the first microinstruction of the subroutine into the second microprogram counter 30. Thereafter, the second microprogram counter 30 is incremented to facilitate sequential addressing of microinstructions associated with the subroutine being executed. When the subroutine has been fully executed, the CSDR 24 facilitates the re-enabling of the first microprogram counter 22, the disabling of the second microprogram counter 30 and the switching of the multiplexer 32 to the first microprogram counter. The first microprogram counter 22 is then incremented so that the next program instruction is executed in a sequential orderly manner.

Figure 2:
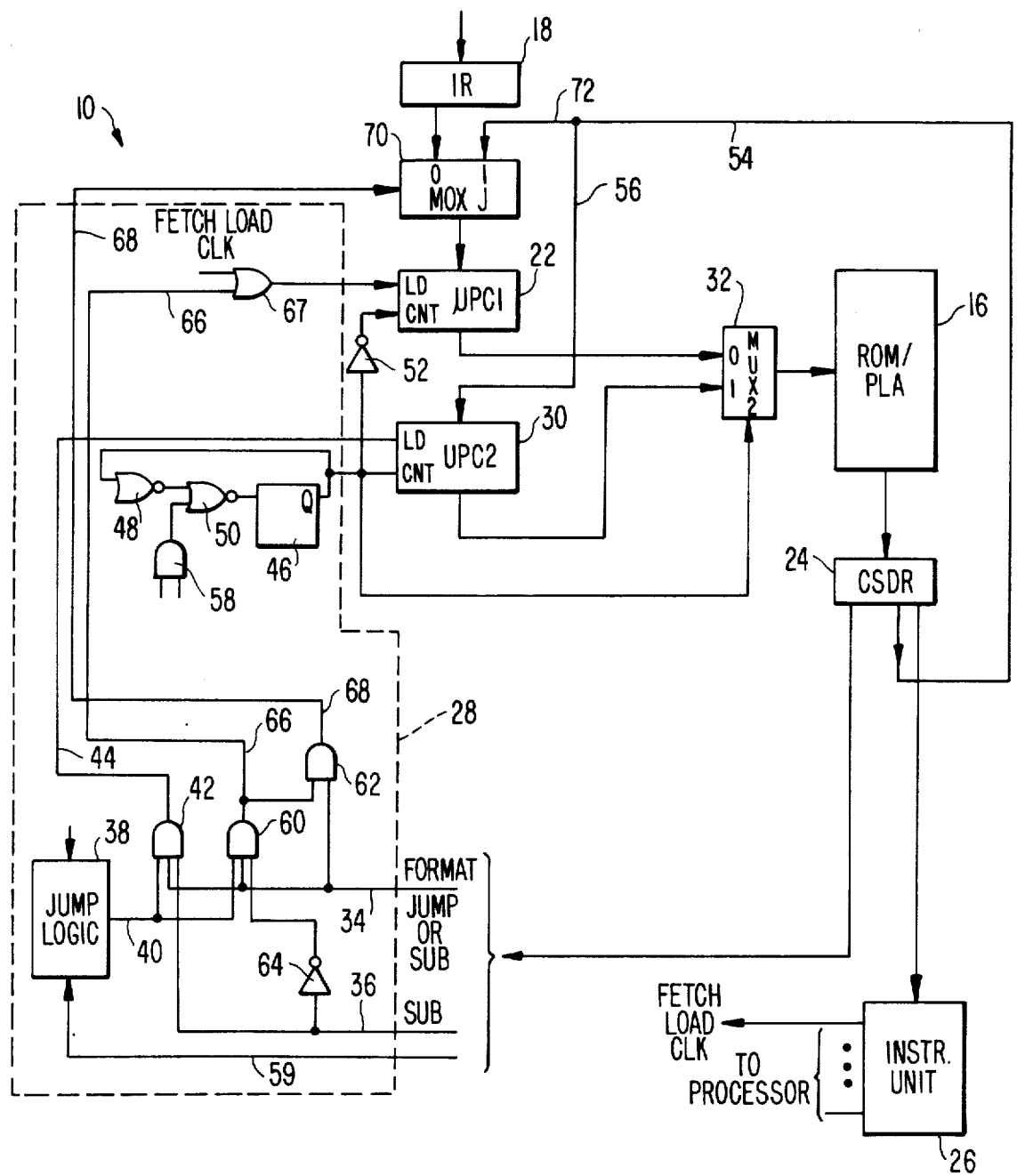
FIG. 2 is a logic implementation of the microsequencer circuit of FIG. 1 in accordance with the principles of the invention.

Referring to FIG. 2, there is shown a logical implementation of the microsequencer 10. As noted above a program instruction is loaded into the instruction register 18. The op code associated with this instruction is decoded by the decoder circuit 20 and a starting address is loaded into the first program counter 22 when the instruction unit 26 generates a "fetch load clock signal." The starting address is then fed through multiplexer 32 to the ROM 16. Thereafter, the addressed microinstruction is loaded into the CSDR 24. If the microinstruction loaded into the CSDR 24 is not a subroutine call, a logic zero is fed to the logic circuit 28 over lines 34 and 36 which indicates that the microinstruction stored in CSDR does not have the format of a jump instruction or a subroutine call and a subroutine will not be executed, respectively. Moreover, a jump logic circuit 38 then generates a logic zero on its output line 40. Lines 34, 36 and 40 are coupled to inputs of an AND gate 42 which facilitate the generation of a logic zero on output line 44. The logic zero appearing on output 44 is fed to an input of a D-type flip flop 46 through NOR gates 48 and 50. A logic zero, which then appears on an output of flip flop 46, is fed to an output of an inverter 52 in order to enable the incrementing of the first microprogram counter 22. The microinstructions stored in the ROM 16 are then addressed sequentially by the microprogram counter 22 until a subroutine call or jump instruction is encountered or a microinstruction is encountered which represents an "end of operation" (ENDOP).

If the microinstruction which was loaded into the CSDR 24 is a subroutine call, a logic one is fed to the logic circuit 28 over each of the lines 34 and 36. Moreover, the jump logic circuit 38 generates a logic one on its output line 40. A logic one now appears on output line 44 which enables the seond microprogram counter 30 to load an address appearing on lines 54 and 56. Additionally, the logic one appearing on line 44 is fed through NOR gates 48 and 50 to the input of flip flop 46. Flip flop 46 then generates a logic one on its output which disables the first microprogram counter 22 and enables the second microprogram counter 30. The second microprogram counter 30 then sequentially accesses microinstructions associated with the subroutine until a microinstruction is accessed which represents a subroutine return. Thereafter, the CSDR 24 feeds a signal representing the subroutine return to an input of an AND gate 58 which causes a flip flop 46 to generate a logic zero on its output. The logic zero appearing on the output of the flip flop 46 facilitates the enabling and incrementing of the first microprogram counter 22 and the disabling of the second microprogram counter 30. Thus, the first microprogram counter 22 then proceeds to sequentially access microinstructions stored in the ROM 16 until the ENDOP statement or another subroutine call is encountered.

Alternately, the microinstruction loaded in the CSDR 24 may represent a conditional or unconditional jump instruction. The CSDR 24 then feeds a logic one over line 34 and logic zero over line 36 to the logic circuit 28. The CSDR 24 also feeds conditional jump signals to the jump logic circuit 38 over line 59. Line 34 is coupled to and feeds the logic one to inputs of AND gates 42, 60 and 62. The logic zero is fed to an input of AND gate 42 and through inverter 64 to an input of AND gate 62. The jump logic circuit 38 then generates a logic one on output line 40 if the jump instruction is an unconditional jump instruction or, if the jump instruction is conditional, when the desired condition generated by the processor has occurred. A logic one now appears on the output line 66 of the AND gate 60 if all of its inputs are of logic one. Output line 66 is coupled to and feeds the logic one to an input of AND gate 62 and OR gate 67. The AND gate 62 then generates a logic one on output line 68 which is then fed to a multiplexer 70. Multiplexer 70, in response to the logic one appearing on output line 68, switches its input from position 0 to position 1. The CSDR 24 feeds a next instruction or a jump address to a second input of the multiplexer 70 over line 54 and 72. Thereafter, microprogram counter 22 is enabled to load the next address by the logic one appearing on the output line 66. Micro program counter 22 then sequentially accesses microinstructions stored in the ROM 16 beginning with the "next instruction or jump address."

Referring again to FIG. 1, the microsequencer circuit 10 may also include a plurality of microprogram counters 74 each having input coupled to respective outputs of a demultiplexer circuit 76. The plurality of microprogram counters 74 facilitates the nesting of subroutines. If the microsequencer circuit 10 is executing a first subroutine and a subroutine call to a second subroutine is encountered, a branched-from address is stored in the second microprogram counter 30 and a starting of address is loaded into a selected one of the plurality of microprogram counters 74 under the control of the logic circuit 28. The selected one of the plurality of microprogram counters 74 then sequentially addresses the instructions associated with the second subroutine. Whenever the second subroutine has been executed, the logic circuit 28 then re-enables microprogram counter 30 to sequentially address the remaining instructions of the first subroutine. The number of subroutines which can be nested using this technique is limited to the number of microprogram counters included in the plurality of microprogram counters 74.

Figure 3:
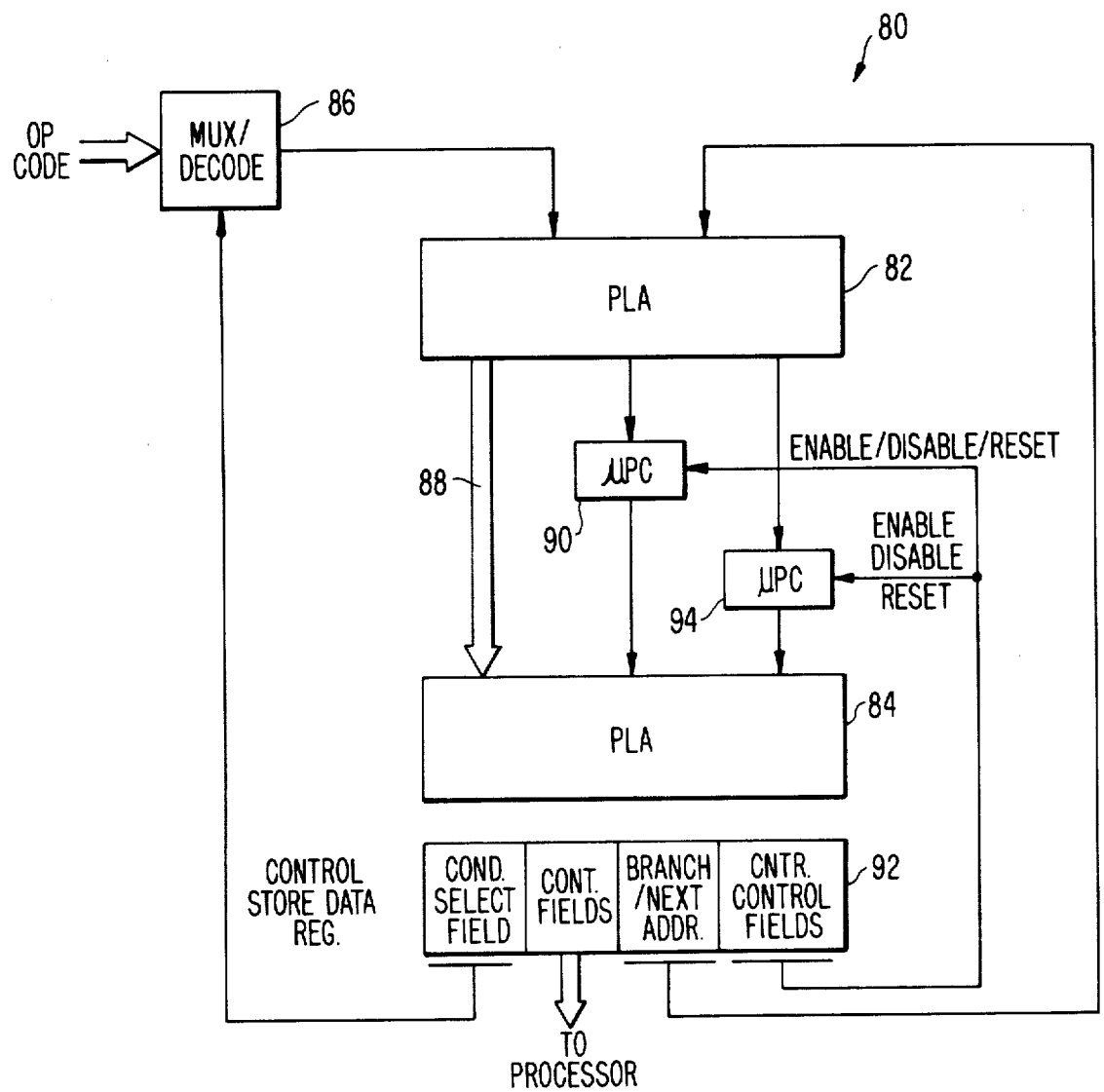
FIG. 3 shows an alternate embodiment of the microsequencer circuit of FIG. 1 in accordance with the principles of the invention.

Referring to FIG. 3, there is shown a alternate embodiment of a microsequencer circuit 80 which utilizes associative memory techniques to establish a starting address. The microsequencer circuit 80 includes two PLAs 82 and 84. An op code which associated with a program instruction, is fed through a multiplexer/decoder circuit 86 to an input of PLA 82. PLA 82 then decodes the op code and generates a starting address. A predetermined number of bits of the starting address are fed directly to an input of PLA 84 over a bus 88. The remaining bits of the starting address which are loaded into a first microprogram counter 90, are also fed to a second input of PLA 84. Thus, PLA 82 serves as an associative memory element which specifies a first, of a sequence of addresses for each program instruction and for each microbranch, microcall and microsubroutine set of microcodes stored in PLA 84. PLA 84 includes a series of sequences of microcode which execute or generate a control word for each of the program instructions, micro branches, microcalls and microsubroutines.

The control words generated by the PLA 84 are sequentially loaded into a control store data register (CSDR) 92. Each of the control words includes a control field which facilitates the operation of the first microprogram counter 90 and a second microprogram counter 94. As noted above the PLA 82 designates the starting address in PLA 84 and the first microprogram counter 90 sequences or counts through the microinstructions associated with the selected op codes. If during the sequencing by the first microprogram counter 90, a microsubroutine is encountered, the first microprogram counter is disabled and the second second microprogram counter is reset, loaded with a branch-/next address stored in the CSDR 92 and enabled to sequence through the microinstructions of the microsubroutine. Moreover, the address of the microsubroutine is a combination of the address appearing on bus 88, the contents of a first microprogram counter 90 and the contents of a second microprogram counter 94. This technique results in a control word having a fewer number of bits. For purposes of the illustration and not of limitation, let us assume that it takes ten bits to address PLA 84 additionally, assume that four bits of the starting address are placed on bus 88 by PLA 82, the first microprogram counter 90 is three bits wide and the second program counter 94 is three bits wide. In this manner, the next address field of the control word is required to be only three bits wide. The remainder of the address bits are generated by the PLA 82.

While the invention has been particularly shown and described with reference to a preferred embodiment thereof, it will be understood by those skilled in the art that various changes and detail maybe made therein without departing from the spirit, scope and teaching of the invention. Accordingly, the improved microsequencer circuit disclosed herein is to be considered merely as illustrative, and the invention is to be limited only as specified in the claims.

What is claimed:

1. An improved microsequencer circuit including a microinstruction counter having a sequential numeric output which is applied to the address input of a microprogram control store memory containing a sequence of micro instructions to be executed, the microsequencer applying address information to said control store memory, the improvement containing:

a first microinstruction counter having an input coupled to an output of said microprogram instruction memory, for receiving an address value corresponding to the initial microinstruction of a primary microinstruction group in said control store memory;

an N-to-1 multiplexer having a first input connected to the output of said first microinstruction counter, having a control input, and having an output connected as the address input to said control store memory;

said control store memory having a primary microinstruction group which includes a plurality of microinstructions, at least one of which includes a destination address field and a subroutine calling field, said control store memory further including a first micro subroutine group consisting of a plurality of microinstructions with a first microinstruction which is addressed by said destination address field of said primary microinstruction group and which further has a subroutine completion field, said control store memory further including a next micro subroutine group whose first microinstruction is addressed by a destination address field in said first micro subroutine group and which further includes a subroutine completed field;

a control store data register having an input connected to the output of said control store memory for receiving destination address field information, subroutine calling field information and subroutine completed field information and having a first output for said subroutine call and said subroutine completion fields connected to said control input of said multiplexer;

a next microinstruction counter having an input connected to a second output of said control store data register for receiving the destination address field output from said control store memory, said next microinstruction counter having an output connected to a next input of said multiplexer;

a logic circuit connected between said first output of said control store data register and said control input of said multiplexer, for controlling, in response to said primary microinstruction group generating a subroutine in said subroutine call field, said multiplexer to disable the output of said first microinstruction counter and enable the output of said next microinstruction counter substantially concurrently with the outputting of a destination address from said primary microinstruction group over said second microinstruction counter, supplying the address for the first microinstruction in the first micro subroutine group stored in said control store memory;

whereby a branched-from microinstruction address is stored in said first microinstruction counter while said first micro subroutine group is being executed.

2. The circuit of claim 1 wherein there are a plurality of N microinstruction counters having outputs applied to said multiplexer, said multiplexer having the logic circuit applying a control input thereto and the second through $N^{th}$ of said microinstruction counters being connected through a demultiplexer to said second output of said control store data register, whereby a plurality of N nested sets of subroutines can be accommodated.

3. A microsequencer for applying address values to an address input of a control store memory to access microinstructions stored therein, comprising:

a control store data register connected to an output of said control store memory, having a destination address field, a subroutine calling field and subroutine completed field, for receiving destination address information, subroutine calling information and subroutine completed information, respectively, associated with microinstructions accessed from said control store;

a plurality of microprogram counters, each counter having an input and an output, for receiving address values over said input thereto and selectively incrementing said address values therein;

switching means having a control input coupled to said subroutine calling field and to said subroutine completed field of said control store data register, and having a switchable path coupled to each of said microprogram counters, for coupling the input of a selected one of said plurality of counters to said next address field of said control store data register and the output of said selected one counter to said address input of said control store memory, in response to said control input;

a first one of said plurality of microprogram counters having a first address value therein which addresses microinstructions in a primary microprogram in said control store memory, said primary microprogram including a calling microinstruction at a branched-from address which calls a subroutine microprogram in said control store memory located at a second address, said calling microinstruction having associated therewith a destination address value representing said second address;

said switchable path of said switching means coupling said input of said first one of said plurality of microprogram counters to said next address field of said control store data register and coupling said output of said first one of said plurality of microprogram counters to said address input of said control store memory;

said first one of said plurality of microprogram counters sequentially incrementing said address value stored therein, accessing a sequence of microinstructions in said primary microprogram, until said first address value equals said branched-from address which accesses said calling microinstruction from said control store memory and transfers said destination address information and said subroutine calling information associated with said calling microinstruction in said control store memory, to said destination address field and said subroutine calling field, respectively, of said control store data register;

said switching means, in response to said subroutine calling information in said calling field, coupling said switchable path thereof between an input of a second one of said plurality of microprogram counters and said next address field of said control store data register and coupling said output of said second one of said plurality of microprogram counters to said address input of said control store memory, for loading said second address of said subroutine microprogram therein;

said subroutine microprogram including a subroutine completed microinstruction at a subroutine completed address having subroutine completed information associated therewith;

said second one of said plurality of microprogram counters sequentially incrementing said address value stored therein, accessing a sequence of microinstructions in said subroutine microprogram in said control store memory, until said address value therein equals said subroutine completed address which accesses said subroutine completed microinstruction from said control store memory and transfers said subroutine completed information to said subroutine completed field of said control store data register;

said switching means, in response to receiving said said subroutine completion information from said control store data register, coupling said output of said first one of said plurality of microprogram counters to said address input of said control store memory, said first one of said plurality of microprogram counters sequentially incrementing said address value stored therein, starting from said branched-from address, resuming the accessing of a sequence of microinstructions in said primary microprogram;

said primary microprogram including a jump microinstruction at a jump-from address which jumps to another portion of the primary microprogram in said control store memory located at a third address, from which there will be no return to said jump-from address, said jump microinstruction having associated therewith a destination address value representing said third address;

said first one of said plurality of microprogram counters sequentially incrementing said address value stored therein, accessing a sequence of microinstructions in said primary microprogram, until said address value therein equals said jump-from address which accesses said jump microinstruction from said control store memory and tranfers said destination address information and subroutine calling information associated with said jump microinstruction in said control store memory, to said destination address field and said subroutine calling field, respectively, of said control store data register;

said switching means, in response to said subroutine calling information associated with said jump microinstruction in said calling field, coupling said switchable path thereof between said input of said first one of said plurality of microprogram counters and said next address field of said control store data register and coupling said output of said first one of said plurality of microprogram counters to said address input of said control store memory, for loading said third address of said subroutine microprogram therein;

said first one of said plurality of microprogram counters sequentially incrementing said address value stored therein, starting from said third address, accessing a sequence of microinstructions in said another portion of said primary microprogram.

* * * * *